Dec. 24, 1957   H. J. LAFAYE   2,817,383
RIM STRUCTURE
Filed Sept. 19, 1956
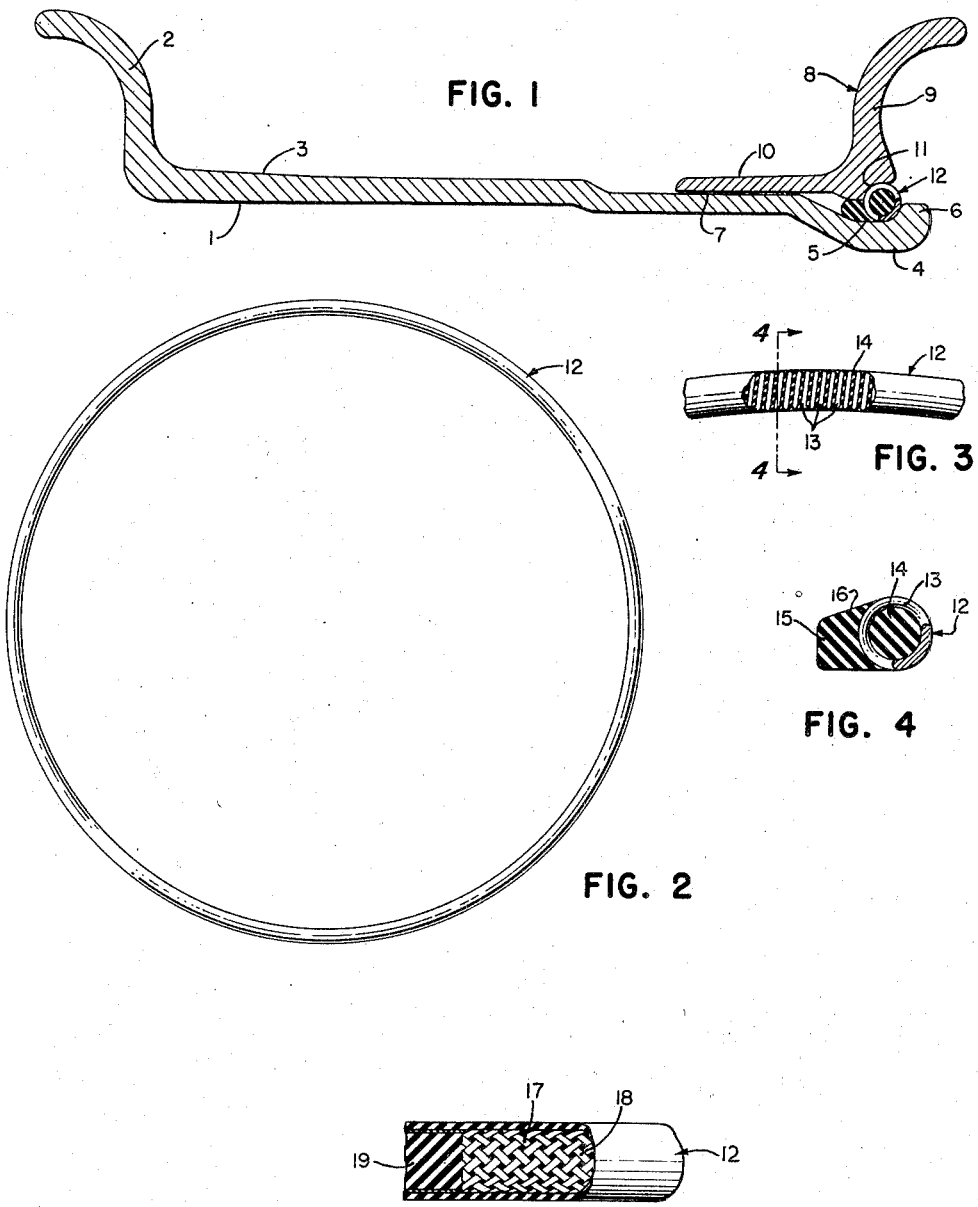
INVENTOR.
HILTON J. LAFAYE
BY
R. L. Miller
ATTORNEY

United States Patent Office 2,817,383
Patented Dec. 24, 1957

2,817,383

RIM STRUCTURE

Hilton J. Lafaye, Akron, Ohio, assignor to The Goodyear Tire & Rubber Company, Akron, Ohio, a corporation of Ohio Application September 19, 1956, Serial No. 610,832

3 Claims. (Cl. 152—409)

This invention relates to a rim and more particularly to multi-part rims for mounting tubeless tires thereon.

Since the introduction of tubeless tires for passenger vehicles, there have been numerous rim structures designed and made for commercial vehicles which in most instances were using previously multi-part rims. Such rims necessarily introduced a problem that was not present in the passenger rim, i. e. the effective sealing of the joints between the rim parts to prevent the escape of the air pressure.

The two types of rim structures that have been most widely accepted and used in the United States for tubeless tires on commercial vehicles have been the modified drop-center one piece rim (larger sizes than previously used) and a three piece rim with an O ring sealing element between the rim parts. Both of these have the inherent requirement of a tire with a larger bead diameter than a conventional tire. This is so because the rim must be interchangeable with a conventional rim on the present wheels and as a result a larger diameter bead seat is necessary in order to provide adequate strength and clearances. In addition the drop center rim is not satisfactory for the larger size tires as it is impossible to button-hole the tire over the rim flange for mounting because of the bead rigidity. The new rim structures require new cross-sectional shapes of rim steel as well as new dies and forming equipment for rim manufacture. Substantial time and money are involved in these changes and in many instances duplication of inventories are necessary.

The larger bead diameter requires major changes by the tire manufacturers, not only in the molds but in the building machines as well as much of the stock preparation machinery. These changes are not only costly but require a considerable period of time to make the conversion. In addition, the conventional sizes are still required so both have to be manufactured and carried in inventory. Resultingly additional equipment is required as well as alterations in part of the existing equipment. It is therefore an object of this invention to provide a multi-part rim structure for tubeless tires that will take a tire with the present conventional bead sizes.

Another object of the invention is to provide a multi-part rim structure that is economical and relatively easy to fabricate.

A further object of the invention is to provide a rim structure that requires little change from the conventional rolled section contours.

A still further object of the invention is to provide a rim structure on which a conventional tire and tube or a tubeless tire may be interchangeably mounted.

Other objects and advantages of this invention will become apparent hereinafter as the description thereof proceeds, the novel features, arrangements and combinations being clearly pointed out in the specification as well as in the claims thereunto appended.

In the drawings:

Fig. 1 is a cross-section of one form of a multi-part rim embodying the invention;

Fig. 2 is a plan view of the lock ring of the rim structure shown in Fig. 1;

Fig. 3 is an enlarged fragmentary view of the lock ring;

Fig. 4 is an enlarged section taken on 4—4 of Fig. 3; and

Fig. 5 is a modification of the invention.

Many of the conventional multi-part rim structures include a split lock ring as one of the elements forming the complete rim assembly. Since the lock ring fits between the other parts of the structure, on the outer extremities thereof, any seal created by the lock ring would prevent the air pressure in a mounted tubeless tire from escaping between the rim parts. The usual split in the lock ring would have to be sealed or eliminated to create a seal and any structure to be practical, would have to withstand the heat and small relative movement between the rim parts that are encountered under service conditions. The lock ring structures of the present invention have proven to provide an effective, lasting seal for a multi-part rim that is interchangeable with present conventional rims.

In the drawings, a rim base 1 of substantially conventional cross-sectional contour has an integral bead retaining flange 2 along one edge. Adjacent to the flange 2 is a tapered bead seat 3 on which one bead of a tire is seated and is retained axially by the flange 2. Along the opposite edge of the base 1 is a radially outwardly facing gutter edge 4 formed of a channel 5 with an upturned edge 6. The outer diameter of the edge 6 is no greater than the diameter of portion 7 of the base 1 adjacent the inner edge of the channel 5.

The endless loose side ring 8 includes a bead retaining flange 9 and radially inwardly extending bead seat portion 10. The other tire bead is seated on the bead seat 10 and retained axially by the flange 9. The side ring 8 is axially movable over the portion 6 of the base and in the assembled position over the gutter 4 and portion 7 of the base 1 so that a circumferentially extending open chamber is formed between the side ring and base. The axially outer lower corner of the side ring 8 as shown, is arcuately notched at 11 to fit a portion of the lock ring 12.

The lock ring 12 as best seen in Figs. 2, 3 and 4 is an extensible endless ring and is of a diameter when unextended, slightly smaller than that of the gutter channel 5. This causes the lock ring 12 to fit the gutter snugly and eliminates any interference with the positioning of the side ring 8. The lock ring 12 is a coil spring formed of closely spaced helical turns 13 of spring steel wire. The diameter of turns 13 of the coil spring is such that it will engage the edge 6 of the gutter and the arcuate notch 11 of the side ring 8 to firmly position them with respect to each other. The coil spring is made endless by joining the ends together either permanently or separably by any of the well known means such as welding or the use of fasteners which are readily available for this purpose. The multiplicity of turns of the coil provide a very high shear resistance to the axial displacement of the side ring 8.

In order to further strengthen the lock ring 12 and provide an airtight seal between side ring 8 and base 1, the space between the turns of the coil and the interior are filled with a resilient, abrasion resistant material such as rubber 14 or rubbery material. To further assure a satisfactory seal, a projection 15 of the rubber material is formed integrally along one side of the ring 12 as a sealing element and extends into the chamber between the side ring 8 and base 1 as seen in Fig. 1. Preferably the upper or radial outer surface of the projection 15 is tapered as at 16 to permit the side ring 8 to move more easily into the assembled position against the coils 13 of the spring. It is desirable that the rubber 14 between and interiorly of the coil spring and the projection 15 be adhered to and vulcanized into the desired shape according to the well known practices of the rubber art. During this procedure, preferably although not essential, a thin film of rubber material is formed on the outer surface of the coils which will in no way interfere with the assembly of the rim and will assist in protecting the coils from the elements as well as providing additional sealing in the contact areas.

In the modification of the invention seen in Fig. 5, the locking ring 12 is formed of an endless open-braided tube 17 of metal wire or ribbon 18 so that it is flexible and extensible to permit the lock ring to be mounted in the channel 4 of the rim base 1. Braided tube structures such as these are well known in the art and the one illustrated is only representative. The interior of the tube 17 preferably is filled with rubber or rubbery material 19 with a portion extending outwardly from one side comparable to projection 15 in Fig. 4. The braided tube 17 permits the ring to be expanded for assembly and imparts sufficient strength to the ring to maintain the rim assembly together.

It is to be understood that the lock ring 12 may be of other forms such as articulated sections which have joined extensible and non-extensible sections. It is only essential that the lock ring be sufficiently extensible to permit it to be positioned in the channel 5 by moving over the flange 6. Any lock ring 12 must necessarily include a resilient sealing material around the periphery to seal the entire rim structure.

In assembling such a rim structure, the tire is placed over the rim base with one bead being urged against bead seat 3. The side ring 8 is then slid inwardly over the base 1 so that the lock ring 12 may be positioned in the channel 5. The tire is then inflated according to the techniques used for tubeless tires which causes the side ring 8 to move out axially until the notched corner 11 engages the lock ring 12. This movement distorts the projection 15 effecting an airtight seal. To dismount, the air pressure in the tire is released, then the side ring 8 is moved axially inwardly sufficiently so that the lock ring 12 may be removed. After this is done, the side ring 8 is removed which permits the tire to be taken off.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A multiple piece rim structure for mounting a tubeless tire thereon comprising a rim base, an endless side ring, and an endless lock ring to retain the base and side ring in the operative position when a tire is mounted thereon, sealing the joints therebetween to prevent the escape of air through the joints; said base being endless and having an integrally formed bead retaining flange extending radially outwardly therefrom along one edge thereof with a tapered bead seat portion adjacent thereto, said base having a radially outwardly facing gutter portion along the opposite edge thereof of a smaller diameter than said base; said endless side ring including an integral radially outwardly extending bead retaining flange and axially inwardly extending bead seat portion adapted to be slidably mounted over the gutter edge portion of said base in superposed relation thereto to form a chamber therebetween; and said lock ring being formed of an annular ring having a diameter when unextended less than that of said gutter, formed of an endless extensible metal core embedded in rubbery resilient material with a portion of the rubbery resilient material projecting outwardly along one side to extend into a portion of the chamber between said side ring and base, the lock ring lying in the gutter and engaging a portion of said side ring to retain the side ring in position with respect to said base with the lock ring being slightly extended when in the operative position and the projecting rubber portion under compression between the base and side ring to effect an airtight seal.

2. A multiple piece rim structure for mounting a tubeless tire thereon comprising a rim base, an endless side ring, and an endless lock ring to retain the base and side ring in the operative position when a tire is mounted thereon sealing the joints therebetween to prevent the escape of air through the joints; said base being endless and having an integrally formed bead retaining flange extending radially outwardly therefrom along one edge thereof with a tapered bead seat portion adjacent thereto, said base having a radially outwardly facing gutter portion along the opposite edge thereof of a smaller diameter than said base; said endless side ring including an integral radially outwardly extending bead retaining flange and axially inwardly extending bead seat portion adapted to be slidably mounted over the gutter edge portion of said base in superposed relation thereto to form a chamber therebetween; and said lock ring being formed of an annular coil spring having a circle diameter less than that of said gutter when unextended and having the interstices of said spring filled with a rubbery resilient material with a portion of said material projecting outwardly along one side of the spring to lie in a portion of said chamber when the lock ring is in the operative position, the lock ring lying in the gutter and engaging a portion of said side ring to retain the side ring in position with respect to said base with the lock ring being slightly extended when in the operative position and the projecting rubber portion under compression between the base and side ring to effect an airtight seal.

3. A multiple piece rim structure for mounting a tubeless tire thereon comprising the rim base, an endless side ring, and an endless lock ring to retain the base and side ring in the operative position when a tire is mounted thereon sealing the joints therebetween to prevent the escape of air through the joints; said base being endless and having an integrally formed bead retaining flange extending radially outwardly therefrom along one edge thereof with a tapered bead seat portion adjacent thereto and having a radially outwardly facing gutter portion along the opposite edge thereof of a smaller diameter than said base; said endless side ring including an integral radially outwardly extending bead retaining flange and axially inwardly extending bead seat portion adapted to be slidably mounted over the gutter edge portion of said base in superposed relation thereto to form a chamber therebetween; and said lock ring being formed of an annular ring having a diameter when unextended less than that of said gutter, formed of an endless extensible braided metal core embedded in rubbery resilient material with a portion of the rubbery resilient material projecting outwardly along one side to extend into a portion of the chamber between said side ring and base, the lock ring lying in the gutter and engaging a portion of said side ring to retain the side ring in position with respect to said base with the lock ring being slightly extended when in the operative position and the projecting rubber portion under compression between the base and side ring to effect an airtight seal.

References Cited in the file of this patent

UNITED STATES PATENTS 2,700,392    Harstick               Jan. 25, 1955

FOREIGN PATENTS 169,033    Great Britain          Mar. 18, 1921